(12) United States Patent
Suh

(10) Patent No.: US 8,844,684 B2
(45) Date of Patent: Sep. 30, 2014

(54) DISC BRAKE

(71) Applicant: Mando Corporation, Gyeonggi-do (KR)

(72) Inventor: Byung Guk Suh, Incheon (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 54 days.

(21) Appl. No.: 13/645,155

(22) Filed: Oct. 4, 2012

(65) Prior Publication Data

US 2013/0081911 A1 Apr. 4, 2013

(30) Foreign Application Priority Data

Oct. 4, 2011 (KR) .................. 10-2011-0100432

(51) Int. Cl.
*F16D 65/40* (2006.01)
*F16D 65/097* (2006.01)
*F16D 55/226* (2006.01)

(52) U.S. Cl.
CPC .......... *F16D 55/226* (2013.01); *F16D 65/0975* (2013.01)
USPC .................. 188/73.38; 188/73.31; 188/73.37

(58) Field of Classification Search
USPC .............. 188/73.31, 73.32, 73.6, 73.7, 73.38, 188/72.3, 72.4, 73.36, 73.37
See application file for complete search history.

(56) References Cited

U.S. PATENT DOCUMENTS

| | | | | | |
|---|---|---|---|---|---|
| 3,403,756 | A | * | 10/1968 | Thirion ...................... | 188/73.43 |
| 3,710,896 | A | * | 1/1973 | Machek ..................... | 188/73.36 |
| 3,841,444 | A | * | 10/1974 | Baum et al. ................. | 188/72.3 |
| 4,394,891 | A | * | 7/1983 | Oshima ...................... | 188/73.38 |
| 4,491,204 | A | * | 1/1985 | Dirauf et al. ............... | 188/73.38 |
| 4,516,666 | A | * | 5/1985 | Sheill ......................... | 188/73.38 |
| 5,069,313 | A | * | 12/1991 | Kato et al. .................. | 188/72.3 |
| 5,310,024 | A | * | 5/1994 | Takagi ........................ | 188/72.3 |
| 5,549,181 | A | * | 8/1996 | Evans ......................... | 188/72.3 |
| 6,378,665 | B1 | * | 4/2002 | McCormick et al. ........ | 188/72.3 |
| 6,719,105 | B1 | * | 4/2004 | Wemple ..................... | 188/73.38 |
| 6,725,980 | B2 | * | 4/2004 | Larkin ........................ | 188/72.3 |
| 7,905,334 | B2 | * | 3/2011 | Reuter et al. ............... | 188/73.38 |
| 2007/0246312 | A1 | | 10/2007 | Bach et al. | |

* cited by examiner

*Primary Examiner* — Thomas J Williams
*Assistant Examiner* — Mariano Sy
(74) *Attorney, Agent, or Firm* — McDermott Will & Emery LLP

(57) ABSTRACT

A disc brake provided with a guide spring capable of preventing a vibration of a pad plate having a friction pad mounted thereon, and capable of separating the friction pad from a disc in a rapid manner after a braking operation is finished, the disc brake including a disc rotating together with a wheel of a vehicle, two pad plates disposed at both lateral sides of the disc, respectively, to perform a braking by pressing both lateral side surfaces of the disc and each having a friction pad, a caliper housing and a piston that are configured to press the pad plate, and a guide spring enabling the pad plates to operate as an integral body and absorb shock.

4 Claims, 4 Drawing Sheets

DISC BRAKE

CROSS-REFERENCE TO RELATED APPLICATION

This application claims the benefit of Korean Patent Application No. 2011-0100432, filed on Oct. 4, 2011 in the Korean Intellectual Property Office, the disclosure of which is incorporated herein by reference.

BACKGROUND

1. Field

Embodiments of the present disclosure relate to a disc brake provided with a guide spring capable of preventing a vibration of a pad plate having a friction pad mounted thereon, and capable of separating the friction pad from a disc in a rapid manner after a braking operation is finished.

2. Description of the Related Art

A disc brake mounted on a vehicle is designed to decelerate, stop, or maintain at a stopped state of a vehicle while in motion, and obtains a braking force by strongly pressing both lateral sides of a disc, which rotates together with a wheel, by use of a friction pad.

In general, a disc brake is provided with a caliper housing and a piston to press friction pads disposed at both lateral sides of the disc toward the disc, and further provided with a carrier mounted on a vehicle body to support the friction pads and the caliper housing.

The disc brake as such is provided with a disc rotating together with a wheel, a pair of pad plates having friction pads, which are disposed at both sides of the disc, attached thereto, a caliper housing and a piston to press the pad plates toward the disc, and a carrier mounted on a vehicle body to support the caliper housing and the pad plates.

Meanwhile, the caliper housing is coupled in a reciprocated manner to the carrier by two guide rods that are coupled to both lateral sides of the caliper housing, and the two pad plates are supported against the carrier so as to enable a reciprocating motion toward both lateral sides of the disc. A pad spring or a fixing clip is interposed between the carrier and the pad plate to support the pad plate in a reciprocated manner while preventing the pad plate from being vibrated.

The pad springs or fixing clips serve to support the pad plates in a shock absorbing manner, thereby preventing the back/forth vibration and upward/downward vibration (the vibration in a radial direction of the disc) of the friction pads. However, the pad springs or the fixing clips have limitations in preventing the vibration of all directions generated when braking the vehicle. In addition, a brake noise (rattle) occurs as a result of the vibration in all directions.

SUMMARY

Therefore, it is an aspect of the present disclosure to provide a disc brake capable of preventing a vibration generated when braking a vehicle, and preventing a brake noise caused by the vibration.

It is another aspect of the present disclosure to provide a disc brake capable of rapidly separating a pad plate having a friction pad mounted thereto from a disc after a braking is performed.

Additional aspects of the disclosure will be set forth in part in the description which follows and, in part, will be obvious from the description, or may be learned by practice of the disclosure.

In accordance with one aspect of the present disclosure, a disc brake having a disc rotating together with a wheel of a vehicle, two pad plates disposed at both lateral sides of the disc, respectively, to perform a braking by pressing both lateral side surfaces of the disc and each having a friction pad, and a caliper housing and a piston that are configured to press the pad plate, the disc brake including a protrusion unit protruding from two end portions of an outer side of the caliper housing, a coupling unit protruding from two end portions of each of the pad plates, and a guide spring formed in a bent manner to surround the protrusion unit and the coupling unit.

The caliper housing may include a first accommodation groove formed at the protrusion unit such that the guide spring is engaged with the first accommodation groove, and the pad plate comprises a second accommodation groove formed at an upper side of the coupling unit such that the guide spring is engaged with the second accommodation groove, and a third accommodation groove formed at a lower side of the coupling unit such that the guide spring is engaged with the third accommodation groove.

The guide spring may include a support unit configured to support a portion of one of the two pad plates, an inner side sliding unit and an outer side sliding unit, which are extending in a bent manner from both end portions of the support unit so as to be coupled in a supporting manner at the second accommodation groove and the third accommodation groove, respectively, a fixing unit coupled to surround the coupling portion of the remaining of the two pad plates, and a locking unit formed between the fixing unit and the inner side sliding unit so as to be coupled in an engaging manner at the first accommodation groove formed on the protrusion unit.

As described above, the disc brake is provided the guide spring capable of preventing a vibration generated between the caliper housing and the pad plate, so that the brake noise caused by the vibration generated at the disc brake when applying a brake is prevented.

In addition, the disc brake has the guide spring making contact with the pad plate at a minimum area, so the pad plates are rapidly separated from the disc after the braking operation is finished. Accordingly, an unnecessary contact between the disc and the pad plates is minimized, so that the fuel efficiency is prevented from being degraded.

In addition, the disc brake has the guide spring substituted for the carrier and omits the carrier, so that the weight of the disc brake is reduced, thereby enhancing the fuel efficiency of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
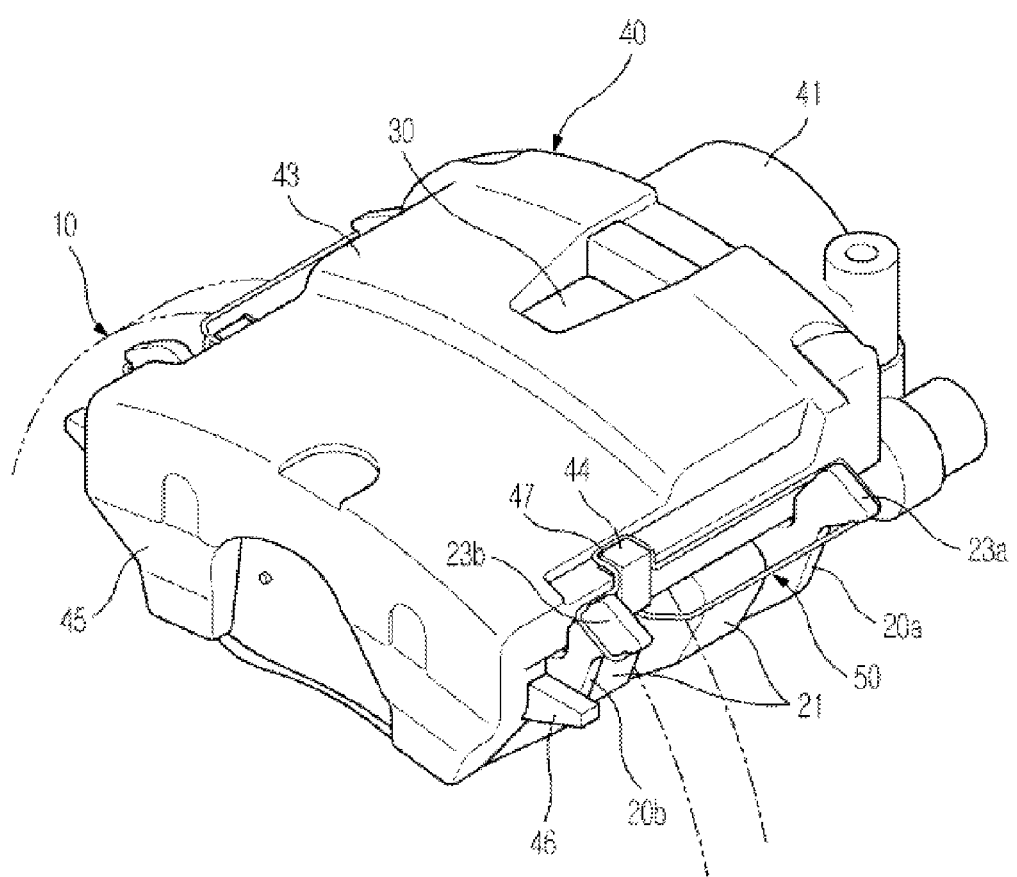
FIG. 1 is an assembled perspective view illustrating a disc brake in accordance with one embodiment of the preset disclosure.

Reference will now be made in detail to the embodiments of the present disclosure, examples of which are illustrated in the accompanying drawings, wherein like reference numerals refer to like elements throughout.

Referring to FIG. 1, a disc brake in accordance with one embodiment of the present disclosure includes a disc 10 rotating together with a wheel of a vehicle, a pair of pad plates 20a and 20b disposed at both sides of the disc 10 and each having a friction pad 21 to perform a braking by pressing both side surfaces of the disc 10, a caliper housing 40 and a piston 30 that are configured to press the pad plates 20a and 20b, and a guide spring 50 allowing the pad plates 20a and 20b to be coupled to the caliper housing 40.

The disc 10, while rotating together with a wheel of a vehicle, is configured to obtain a braking force by pressing the friction pad 21 to both lateral side surfaces of the disc 10 to cause friction. A portion of the disc 10 is disposed between the two friction pads 21 so as to make contact with the friction pad 21 at the braking.

The pair of pad plates 20a and 20b is divided into a first pad plate 20a adjacent to the piston 30 and a second pad plate 20b adjacent to a finger 45 that is to be described later.

The caliper housing 40, as shown in FIG. 1, includes a cylinder 41, a body 43 and the finger 45. The body 43 is provided in the center of the caliper housing 40, and the cylinder 41 and the finger 45 are connected to a front side and a rear side of the caliper housing 40, respectively. A hydraulic pressure for braking is generated at a master cylinder (not shown), and is transferred to the caliper housing 40.

The cylinder 41 is provided at one side of the caliper housing 40, that is, the rear side of the caliper housing 40, such that the piston 30 reciprocates. In addition, a sealing member (not shown) formed of an elastic material is installed at an inner circumference of the cylinder 41 to restore the piston 30.

The piston 30 described above, as shown in FIG. 1, is provided at an inner side of the cylinder 41 to press the first pad plate 20a. That is, at the braking, the piston 30 presses the first pad plate 20a by moving forward to a position, at which the disc 10 is provided, and returns to its original position by moving backward after the braking operation is finished.

Figure 4:
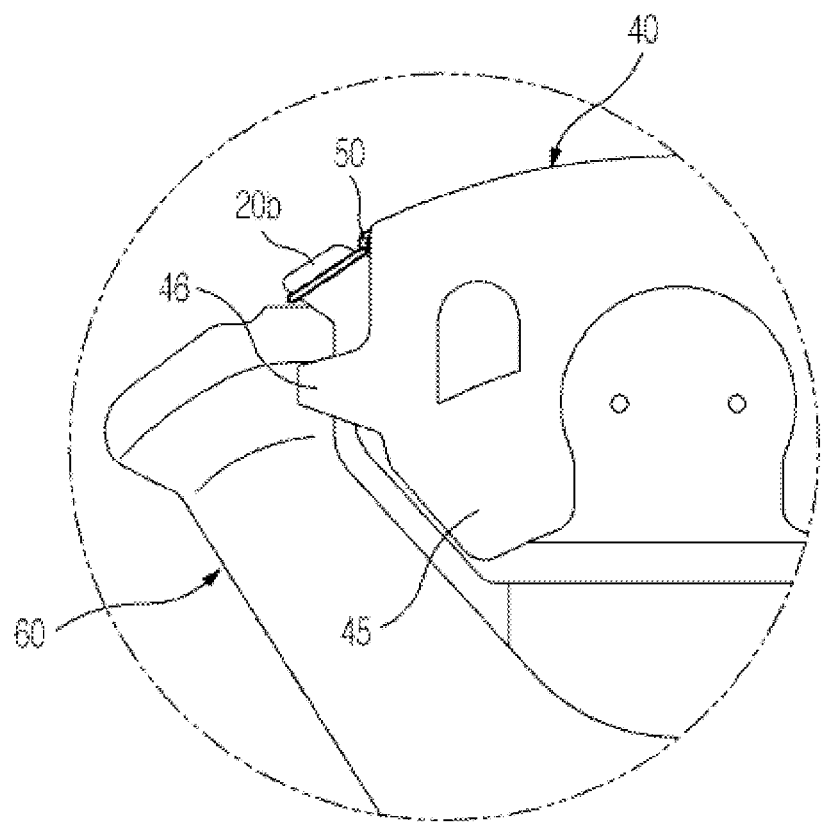
FIG. 4 is a cross sectional view illustrating a vehicle having the disc brake in accordance with the embodiment of the preset disclosure mounted thereon.

The finger 45 is provided at the other side of the caliper housing 40, that is, the front side of the caliper housing 40 such that the second pad plate 20b is slid toward the disc 10 together with the sliding of the caliper housing 40. The finger 45 is provided with a finger protrusion unit 46 coming into close contact with a knuckle 60 that is configured to fix the disc brake to a vehicle body as shown in FIG. 4.

Meanwhile, the caliper housing 40 is provided with protrusion units 44 formed at two end portions of an outer side of the body 43 such that a guide spring 50, which is to be described later, is coupled to the protrusion units 44. The protrusion unit 44 is provided in the form of a hook. As illustrated on the drawing, the protrusion units 44 protrude from two lateral side surfaces of the caliper housing 40 at an angle of 90 degrees, and then extend toward each other. In this case, the protrusion units 44 are provided at opposite surfaces thereof facing each other with a first accommodation groove 47 such that the guide spring 50 is stably fixed to the protrusion units 44. The first accommodation groove 47 is formed in a shape corresponding to the protrusion unit 44 while extending along a side surface of the protrusion unit 44. The first accommodation groove 47 is provided with a cross section having a semi-circular shape such that the guide spring 50 provided in a shape of a wire is attached/detached to the first accommodation groove 47.

Figure 2:
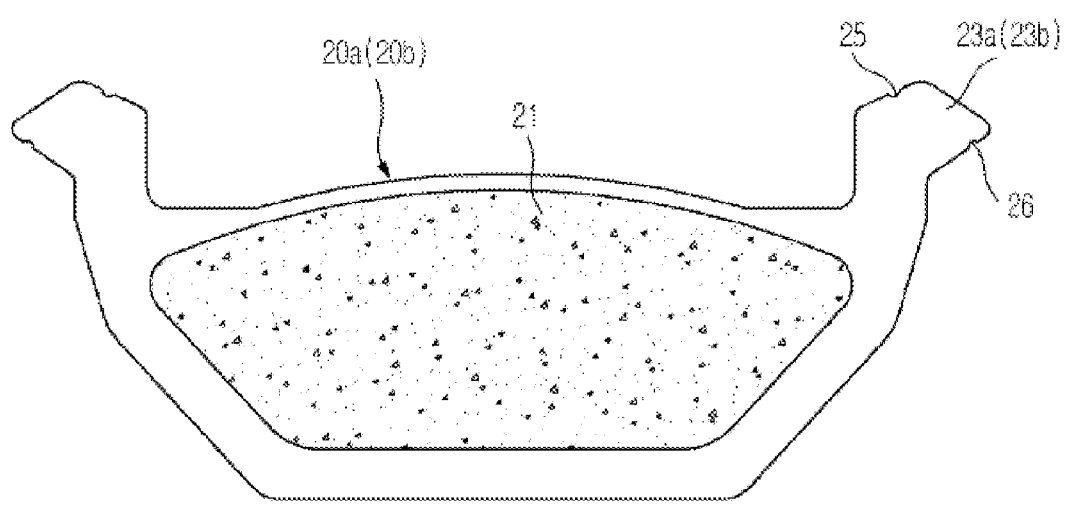
FIG. 2 is a cross sectional view illustrating a first pad plate and a second pad plate of the disc brake in accordance with the embodiment of the preset disclosure.

The pair of pad plates 20a and 20b, as shown in FIGS. 1 and 2, is mounted in a sliding manner on the guide spring 50 to press the disc 10. The first pad plate 20a has an inner surface to which the friction pad 21 is attached, and an outer surface making contact with a front end of the piston 30. The second pad plate 20b has an inner surface to which the friction pad 21 is attached, and an outer surface making contact with the finger 45.

The first pad plate 20a and the second pad plate 20b are provided at both lateral sides thereof with a first coupling unit 23a and a second coupling unit 23b, respectively, protruding in a way that the guide spring 50 is coupled to the first coupling unit 23a and the second coupling unit 23b. A second accommodation groove 25 is formed at an upper portion of each of the first coupling unit 23a and the second coupling unit 23b, and a third accommodation groove 26 is formed at a lower portion of each of the first coupling unit 23a and the second coupling unit 23b. Accordingly, the guide spring 50 is supported at the second accommodation groove 25 and the third accommodation groove 26, and is coupled while surrounding the first coupling unit 23a and the second coupling unit 23b. In this case, each of the second accommodation groove 25 and the third accommodation groove 26 is provided with a cross section having a semi-circular cross section such that the guide spring 50 is attached/detached to the second accommodation groove 25 and the third accommodation groove 26.

Figure 3:
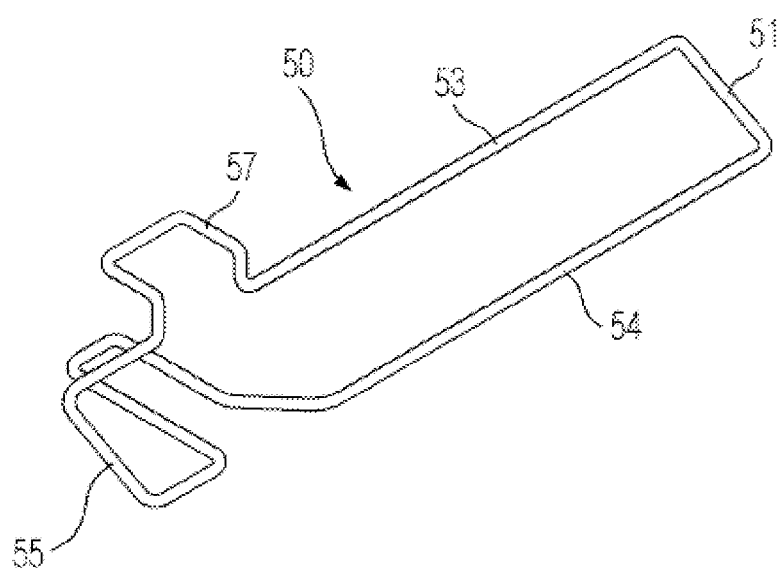
FIG. 3 is a perspective view illustrating a guide spring of the disc brake in accordance with the embodiment of the preset disclosure.

The guide spring 50, as shown in FIGS. 1 to 3, is mounted between the caliper housing 40 and the pad plates 20a and 20b to enable a smooth movement of the pad plates 20a and 20b and prevent a noise caused by a vibration of the pad plates 20a and 20b when the vehicle is being vibrated. The guide spring 50 is provided in the shape of a wire having a circular cross section with a predetermined diameter. The guide spring 50 is an integral body having one end coupled to the other end thereof in a closed loop shape. The guide spring 50 includes a support unit 51, an inner side sliding unit 53, an outer side sliding unit 54, a fixing unit 55, and a locking unit 57.

In detail, the support unit 51 of the guide spring 50 supports the rear side of the first pad plate 20a. That is, the support unit 51 is supported at a rear side surface of the first coupling unit 23a of the first pad plate 20a, and both ends of the support unit 51 are formed in a bent manner at an angle of 90 degrees to surround an upper side and a lower side of the first coupling unit 23a. At the cancellation of the braking, the support unit 51 moves backward by an eccentricity of the disc 10, thereby restricting the displacement of the first pad plate 20a.

The inner side sliding unit 53 and the outer side sliding unit 54 of the guide spring 50 extend from the bent both ends of the support unit 51, respectively. The inner side sliding unit 53 and the outer side sliding unit 54 serve to guide the first pad plate 20a at the braking. That is, the inner side sliding unit 53 and the outer side sliding unit 54 are supported by the second accommodation groove 25 and the third accommodation groove 26 of the first coupling unit 23a, respectively, so that the first pad plate 20a stably reciprocates while being guided by the inner side sliding unit 53 and the outer side sliding unit 54 at the braking or at the cancellation of the braking.

In this case, each of the inner side sliding unit 53 and the outer side sliding unit 54 is provided in the form of a wire and has a minimum contact area making contact with the accommodation grooves 25 and 26 of the first coupling unit 23a. Accordingly, the first pad plate 20a, after the braking, is rapidly separated without a frictional resistance, so the cancellation of braking is rapidly achieved.

In addition, the fixing unit 55 of the guide spring 50 is configured to surround the second coupling unit 23b so as to enable a fixation of the second pad plate 20b. That is, the fixing unit 55 is coupled while surrounding an upper side, a lower side, a front side, and a rear side of the second coupling unit 23b. In this case, the fixing unit 55 is fastened and mounted to the second accommodation groove 25 and to the third accommodation groove 26 that are formed at the second coupling unit 23b.

The locking unit 57 of the guide spring 50 is formed between the inner side sliding unit 52 and the fixing unit 55. The locking unit 57 is provided in a shape of a hook being bent at an acute angle. That it, the locking unit 57 is a portion at which the guide spring 50 is coupled to the protrusion unit 44, and has a shape corresponding to the protrusion unit 44 to surround the protrusion unit 44. That is, as shown in FIG. 1, the locking unit 57 is supported at the first accommodation groove 47 formed at the protrusion unit 44 and is coupled to the protrusion unit 44.

Hereinafter, the operation and effect of the disc brake having the structure as such will be described.

First, in a state where a vehicle is in motion, if a user steps on a brake pedal, the master cylinder (not shown) generates a hydraulic pressure for the braking, and the hydraulic pressures for the braking is transferred to the caliper housing 40.

The hydraulic pressure causes the piston 30 of the cylinder 41 provided at one side of the caliper housing 40 to press the first pad plate 20a, and the caliper housing 40 is pushed backward by the hydraulic pressure and by the reaction force of the piston 30, and thus the finger 45 provided at the other side of the caliper housing 40 pushes the second pad plate 20b.

In this case, the disc brake in accordance with the embodiment of the present disclosure provides a vertical elasticity at both lateral sides of the caliper housing 40 by having the guide spring 50 coupled to the protrusion unit 44 of the caliper housing 40 and the first and second pad plates 20a and 20b, so that the vibration generated between the caliper housing 40 and the pad plates 20a and 20b is prevented. In addition, the finger protrusion unit 46 protruding from both sides of the finger 45 comes into close contact with the knuckle 60, thereby preventing a rattle noise from being generated during the braking operation.

In addition, the disc brake in accordance with the embodiment of the present disclosure has a minimum contact area between the guide spring 50 and the pad plates 20a and 20b, so that the pad plates 20a and 20b are rapidly separated from the disc 10 after the braking operation is finished. Accordingly, an unnecessary friction between the disc 10 and the first and second pad plates 20a and 20b is minimized, so that the fuel efficiency of the vehicle is prevented from being degraded.

Meanwhile, the disc brake in accordance with the embodiment of the present disclosure has the guide spring 50 substituted for a carrier, which is generally included in a conventional disc brake, and omits the carrier, so that the weight of the disc brake is reduced, thereby enhancing the fuel efficiency of the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A disc brake having a disc rotating together with a wheel of a vehicle, two pad plates disposed at both lateral sides of the disc, respectively, to perform a braking by pressing both lateral side surfaces of the disc and each having a friction pad, and a caliper housing and a piston that are configured to press the pad plate, the disc brake comprising:
    a protrusion unit protruding from two end portions of an outer side of the caliper housing, a coupling unit protruding from two end portions of each of the pad plates, and a guide spring formed in a bent manner to surround the protrusion unit and the coupling unit,
    wherein the guide spring extends from a coupling unit of one of the pad plates to a coupling unit of the other one of the pad plates along a first path, and extends from the coupling unit of the other one of the pad plates back to the coupling unit of the one of the pad plates along a second path different from the first path.

2. The disc brake of claim 1, wherein the caliper housing comprises a first accommodation groove formed at the protrusion unit such that the guide spring is engaged with the first accommodation groove, and
    the pad plate comprises a second accommodation groove formed at an upper side of the coupling unit such that the guide spring is engaged with the second accommodation groove, and a third accommodation groove formed at a lower side of the coupling unit such that the guide spring is engaged with the third accommodation groove.

3. The disc brake of claim 2, wherein the guide spring comprises a support unit configured to support a portion of one of the two pad plates, an inner side sliding unit and an outer side sliding unit, which are extending in a bent manner from both end portions of the support unit so as to be coupled in a supporting manner at the second accommodation groove and the third accommodation groove, respectively, a fixing unit coupled to surround a coupling portion of the remaining of the two pad plates, and a locking unit formed between the fixing unit and the inner side sliding unit so as to be coupled in an engaging manner at the first accommodation groove formed on the protrusion unit.

4. The disc brake of claim 1, wherein the guide spring has a closed-loop shape.

* * * * *